United States Patent
Watarai

(10) Patent No.: US 9,546,731 B2
(45) Date of Patent: Jan. 17, 2017

(54) BICYCLE GEAR CHANGING CONTROL APPARATUS, ELECTRICALLY ASSISTED SYSTEM, AND BICYCLE GEAR CHANGING CONTROL METHOD

(71) Applicant: Shimano Inc., Sakai, Osaka (JP)

(72) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 13 days.

(21) Appl. No.: 14/717,595

(22) Filed: May 20, 2015

(65) Prior Publication Data

US 2015/0345620 A1 Dec. 3, 2015

(30) Foreign Application Priority Data

May 29, 2014 (JP) ................................ 2014-111507

(51) Int. Cl.
| | | |
|---|---|---|
| *F16H 59/40* | (2006.01) | |
| *F16H 61/02* | (2006.01) | |
| *B62M 11/16* | (2006.01) | |
| *B62M 25/08* | (2006.01) | |
| B60W 20/00 | (2016.01) | |
| B62M 25/00 | (2006.01) | |

(Continued)

(52) U.S. Cl.
CPC .......... *F16H 61/0213* (2013.01); *B62M 11/16* (2013.01); *B62M 25/08* (2013.01); *B60W 20/30* (2013.01); *B62M 2025/006* (2013.01); *F16H 59/40* (2013.01); *F16H 59/44* (2013.01); *F16H 2059/006* (2013.01); *F16H 2059/446* (2013.01); *F16H 2061/023* (2013.01); *Y10T 477/33* (2015.01)

(58) Field of Classification Search
CPC ................ Y10T 477/33; B60W 20/30; B62M 2025/006; B62M 25/08; F16H 61/0213; F16H 59/40; F16H 59/44; F16H 2059/446; F16H 2061/023; F16H 2059/006
USPC .......................................................... 701/52
See application file for complete search history.

(56) References Cited

U.S. PATENT DOCUMENTS 5,900,705 A * 5/1999 Kimura .................... B62H 5/08
                                                                    180/221
7,144,027 B2  12/2006 Kitamura et al.
(Continued)

FOREIGN PATENT DOCUMENTS

EP  0831021 A2 * 3/1998 ............ B62M 25/00
JP  2617059 B2  3/1997

*Primary Examiner* — Roger Pang
(74) *Attorney, Agent, or Firm* — Global IP Counselors

(57) ABSTRACT

A bicycle gear changing control apparatus includes a controller that is programmed to control a gear changing state of a bicycle transmission according to an operation of a gear changing operating device upon determining a bicycle traveling speed is greater than a first speed. The controller controls the transmission automatically to be in a first prescribed gear changing state upon determining the bicycle traveling speed becomes less than or equal to the first speed and upon determining a gear ratio of a current gear changing state of the transmission is larger than a preset gear ratio of the first prescribed gear changing state. The controller controls the transmission automatically, after controlling the transmission to be in the first prescribed gear changing state, to a larger gear ratio than the gear ratio of the first prescribed gear changing state, upon determining the bicycle traveling speed becomes greater than a second speed.

9 Claims, 4 Drawing Sheets

(51) Int. Cl.
*F16H 59/00* (2006.01)
*F16H 59/44* (2006.01)

(56) References Cited

U.S. PATENT DOCUMENTS

| | | | | |
|---|---|---|---|---|
| 2002/0094906 | A1* | 7/2002 | Jordan | B62M 25/08 |
| | | | | 475/254 |
| 2002/0128097 | A1* | 9/2002 | Takebayashi | B62M 9/10 |
| | | | | 474/58 |
| 2003/0096674 | A1* | 5/2003 | Uno | B62M 25/04 |
| | | | | 477/115 |
| 2015/0307157 | A1* | 10/2015 | Gao | B62M 6/45 |
| | | | | 701/52 |
| 2015/0337951 | A1* | 11/2015 | Tetsuka | F16H 61/0213 |
| | | | | 701/52 |

* cited by examiner

BICYCLE GEAR CHANGING CONTROL APPARATUS, ELECTRICALLY ASSISTED SYSTEM, AND BICYCLE GEAR CHANGING CONTROL METHOD

CROSS-REFERENCE TO RELATED APPLICATIONS

This application claims priority to Japanese Patent Application No. 2014-111507, filed on May 29, 2014. The entire disclosure of Japanese Patent Application No. 2014-111507 is hereby incorporated herein by reference.

BACKGROUND

Field of the Invention

This invention generally relates to changing gears of a bicycle. More specifically, the present invention relates to a gear changing control apparatus that controls the gear changing state of a bicycle transmission, an electrically assisted system, and a bicycle gear changing control method.

Background Information

Generally, when a rider starts to pedal a bicycle that has been stopped, the manual drive force when starting to pedal can be made to be lighter when the gear ratio is smaller. For this reason, the bicycle gear changing control apparatus of Japanese Patent No. 2,617,059 changes to a gear ratio that is suitable for starting to pedal a bicycle from a stopped state.

SUMMARY

Generally, the present disclosure is directed to various features of with respect to changing gears of a bicycle.

According to a bicycle gear changing control apparatus of Japanese Patent No. 2,617,059, the rider can begin to pedal with a small manual drive force. Meanwhile, there is the risk that the gear ratio after being changed by the gear changing control apparatus may not be appropriate as a gear ratio once pedaling has been started. The bicycle gear changing control apparatus of Japanese Patent No. 2,617,059 does not change the gear ratio after pedaling has been started. For this reason, the rider-conducts an operation to change the gear ratio to a gear ratio that is suitable for riding after starting to pedal the bicycle. As a result, there is the fear that changing the gear ratio will be bothersome to the rider.

One object of the present invention is to provide a bicycle gear changing control apparatus, an electrically assisted system, and a bicycle gear changing control method that can reduce the hassle regarding the changing of the gear ratio when starting to pedal again after the bicycle has come to a stop.

In view of the state of the known technology and in accordance with a first aspect of the present disclosure, a bicycle gear changing control apparatus according to one embodiment of the present invention is a bicycle gear changing control apparatus that basically controls a gear changing state of a bicycle transmission. The bicycle gear changing control apparatus comprises: a controller. The controller is programmed to control a gear changing state of a bicycle transmission according to an operation of a gear changing operating device upon determining a traveling speed of a bicycle is greater than a first speed. The controller is programmed to control the bicycle transmission automatically to be in a -first prescribed gear changing state upon determining the traveling speed of the bicycle becomes less than or equal to the first speed and upon determining a gear ratio of a current gear changing state of the bicycle transmission is larger than a preset gear ratio of the first prescribed gear changing state. The controller is programmed to control the bicycle transmission automatically, after controlling the bicycle transmission to be in the first prescribed gear changing state, to a larger gear ratio than the gear ratio of the first prescribed gear changing state, upon determining the traveling speed of the bicycle becomes greater than a second speed.

In accordance with a second aspect of the present invention, the bicycle gear changing control according to the first aspect is configured so that the controller is further programmed to control the bicycle transmission to be in a second gear changing state that corresponds to a gear ratio that is larger than the gear ratio of the first prescribed gear changing state upon determining the traveling speed of the bicycle has become greater than the second speed after controlling the bicycle transmission to be in the first prescribed gear changing state.

In accordance with a third aspect of the present invention, the bicycle gear changing control according to the first aspect is configured so that the gear ratio of the second gear changing state is a gear ratio of the gear changing state that existed at a point in which the. traveling speed of the bicycle was determined to be become less than or equal to the first speed.

In accordance with a fourth aspect of the present invention, the bicycle gear changing control according to the first aspect is configured so that the controller is further programmed to control the bicycle transmission after the traveling speed of the bicycle becomes greater than the second speed based on a length of time after controlling the bicycle transmission in order to be in the first prescribed gear changing state.

In accordance with a fifth aspect of the present invention, the bicycle gear changing control according, to the first aspect is configured so that the controller is further programmed to control the bicycle transmission according to the traveling speed upon the traveling speed of the bicycle becoming greater than the second speed after controlling the bicycle transmission to be in the first prescribed gear changing state.

In accordance with a sixth aspect of the present invention, the bicycle gear changing control according to the first aspect is configured so that the controller further comprises a prohibition setting unit that prohibits the bicycle transmission from being automatically controlled.

In accordance with a seventh aspect of the present invention, the bicycle gear changing control according to the first aspect is configured so that the controller is further programmed to prohibit the bicycle transmission from being automatically controlled after controlling the bicycle transmission to be in the first prescribed gear changing state upon determining that the traveling speed of the bicycle does not become greater than the second speed within a prescribed time until the traveling speed of the bicycle becomes greater than the second speed and the traveling speed of the bicycle becomes less than or equal to the first speed again.

In accordance with an eighth aspect of the present invention, the bicycle gear changing control according to the first aspect is configured, so that the controller is further programmed, to control the gear changing state of the bicycle transmission according only to the operation of the gear changing operating device while the gear changing operating device is being prohibited from being automatically controlled.

In accordance with a ninth aspect of the present invention, the bicycle gear changing control according to the first aspect is configured so that the gear changing control apparatus-further comprises a storage device that stores the gear changing state of the bicycle transmission upon the traveling speed of the bicycle becoming less than or equal to the first speed.

In accordance with a tenth aspect of the present invention, the bicycle gear changing control according to the first aspect is configured so that the first speed and the second speed are 0 km per hour.

In accordance with another aspect of the present invention, an electrically assisted bicycle according to another embodiment of the present invention comprises the bicycle gear changing control apparatus as recited, in any one of the above-described first to tenth aspects and a motor that assists a manual drive force.

In accordance with yet another aspect of the present invention, a bicycle gear changing control method according to another embodiment of the present invention is a bicycle gear changing control method that controls a gear changing state of a bicycle transmission. In this method, the gear changing state of the transmission is controlled according to an operation of a gear changing operating device while a traveling speed of a bicycle is greater than a first speed. In this method, the transmission is automatically controlled to be in a first prescribed gear changing state upon the traveling speed of the bicycle becoming less than or equal to the first speed and upon a gear ratio of a current gear changing state of the bicycle transmission becoming larger than a gear ratio of the first prescribed gear changing state. In this method, the transmission is further automatically controlled, after controlling the transmission to be in the first prescribed gear changing state so that the gear ratio will be larger than the gear ratio of the first prescribed gear changing state upon the traveling speed of the bicycle becomes greater than a second speed.

According to the present bicycle gear changing control apparatus, the electrically assisted system, and the bicycle gear changing control method, the hassle associated with changing the gear ratio when starting to pedal a bicycle again after the bicycle has come to a stop can be reduced.

Also other objects, features, aspects and advantages of the disclosed bicycle gear changing control apparatus will become apparent so those skilled in the art from the following detailed description, which, taken in conjunction with the annexed drawings, discloses one embodiment of the bicycle gear changing, control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
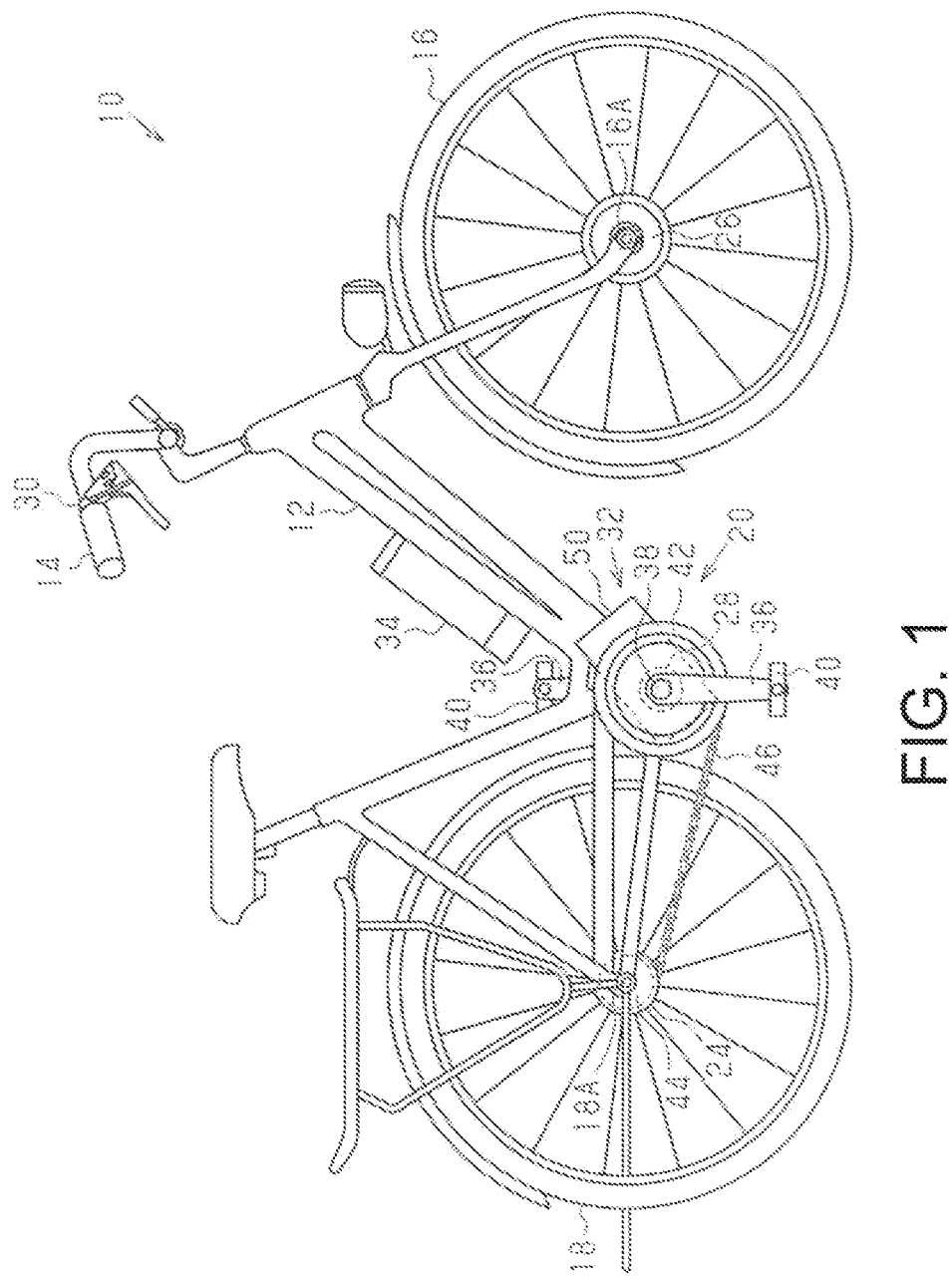
FIG. 1 is a side elevational view of a bicycle that is equipped with a bicycle gear changing control apparatus in accordance with one illustrated embodiment.

Referring initially to FIG. 1, a bicycle 10 is illustrated that basically comprises a frame 12, a handle 14, a front wheel 16, a rear wheel 18, a drive mechanism 20, a transmission 24, a dynamo 26, a pedaling force sensor 28, a gear changing operating device 30, an assist mechanism 32, a control unit 60 (refer to FIG. 2) and a battery 34.

The drive mechanism 20 comprises left and right, crank, arms 36, a crankshaft 38, left and right pedals 40, a front sprocket 42, a rear sprocket 44 and a chain 46. The left and right crank, arms 36 are rotatably attached to the frame 12 with respect to the frame 12 via one end of the crankshaft 38. The pedals 40 are attached to the crank arms 36 in order to be rotatable around a pedal shaft with respect to the crank arms 36.

The front sprocket 42 Is coupled with the crankshaft 38. The front sprocket 42 is provided coaxially with the crankshaft 38. The front sprocket 42 can be coupled in order to not rotate relatively with the crankshaft 38, or this sprocket can be coupled via a one-way clutch so that the front sprocket 42 will also rotate forward when the crankshaft rotates forward. The rear sprocket 44 is rotatably attached around an axle 18A of the rear wheel 18. The rear sprocket 44 is coupled with the rear wheel 18 via the one-way clutch (omitted from the drawings). The chain 46 is wrapped onto the front sprocket 42 and the rear sprocket 44. When the crank arm 36 rotates due to a manual drive force that is applied to the pedals 40, the rear wheel 18 is rotated by the front sprocket 42, the chain 46, and the rear sprocket 44.

The dynamo 26 is provided around the axle 16A of the front wheel 16. The dynamo 26 of the present embodiment is a hub dynamo. The dynamo 26 outputs a signal corresponding to a rotational speed of the front wheel 16.

The pedaling force sensor 28 outputs a signal, corresponding to a force that is applied to the crankshaft 38. The force that is applied to the crankshaft 38 correlates with the manual drive force that is applied to the pedals 40. For this reason, the pedaling force sensor 28 outputs a signal corresponding to the manual drive force. The pedaling force sensor 28 can be provided along the power transmission path from the crankshaft 38 to the front sprocket 42, in the vicinity of the power transmission path, or to the crank arm 36 of the pedals 40. The pedaling force sensor 28 can be realized by using, for example, a strain sensor, a magnetostrictive sensor, an optical sensor, or a pressure sensor, and any sensor can be employed as long as the sensor outputs a signal corresponding to the manual drive force that is applied to the pedals 40.

The gear changing operating device 30 is attached to the handle 14. The gear changing operating device 30 outputs a gear changing signal according to an operation of the rider. The gear changing signal includes an upshift signal indicating an upshifting and a downshift signal indicating a downshifting. The upshift is a shifting in the direction in which the gear ratio γ becomes larger. The downshift is a shifting in which the gear ratio γ becomes smaller.

The transmission 24 is realized by an internal transmission that is integrated with a hub. The transmission 24 comprises a plurality of shift positions and includes, for example, shift positions from a first gear to a third gear. The transmission 24 comprises an actuator 48 (refer to FIG. 2) and a planetary gear mechanism (diagram omitted) that is controlled by the actuator 48. The actuator 48 is for example, an electric motor. The actuator 48 changes the shift position of the bicycle 10, that is, the gear ratio γ, by changing the coupling state of the gears that configure the planetary gear mechanism.

The assist mechanism 32 comprises a motor 50 and a reduction gear (diagram omitted). The motor 50 is an electric motor that is rotated by electric power supplied by the battery 34. The rotation of the motor 50 is transmitted to the front sprocket 42 via the reduction gear. A one-way clutch for preventing the motor from being rotated by the manual drive force when the crank arm 36 rotates forward can be provided between the motor 50 and the front sprocket. The assist mechanism 32 comprising the motor 50 assists the manual drive force that rotates the front sprocket 42 with the drive of the motor 50.

Figure 2:
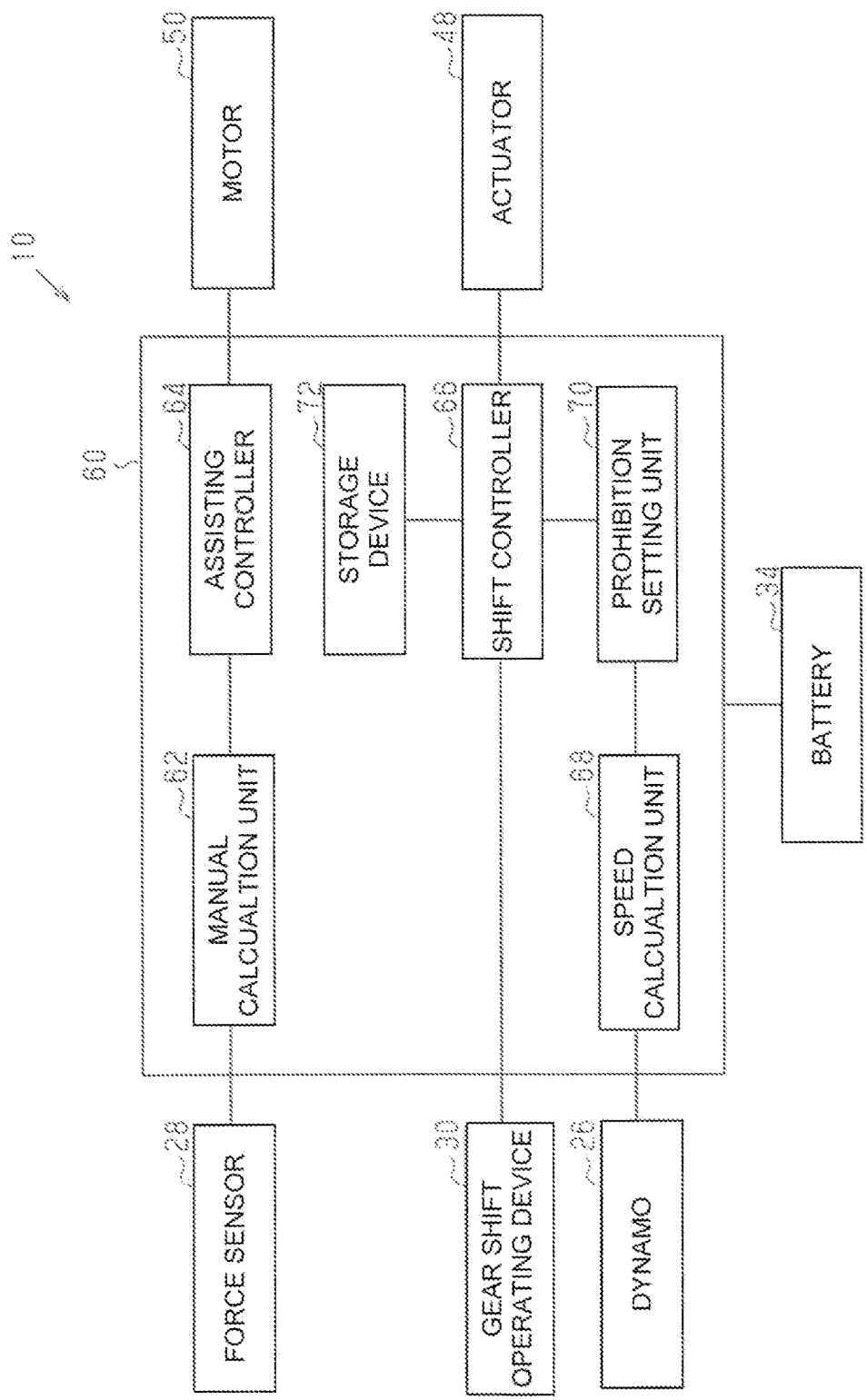
FIG. 2 is a block diagram showing an overall configuration of the bicycle gear changing control apparatus of the illustrated embodiment.

The configuration of the control unit 60 will be explained with reference to FIG. 2. The control unit 60 preferably includes one or more processors with one or more control programs that controls various aspects of the bicycle 10 as discussed below. The control unit 60 can also include other conventional components such as an input interface circuit, an output interface circuit and storage devices such as a ROM (Read Only Memory) device and a RAM (Random Access Memory) device. The memory stores processing results and control programs such as ones for the control operation that are run by the one or more processors.

The control unit 60 comprises a manual force calculation unit 62, an assisting controller 64, a shift controller 66, a speed calculation unit 68, a prohibition setting unit 70 and a storage device 72. The control unit 60 is connected by power lines to each of the dynamo 26, the pedaling force sensor 28, the gear changing operating device 30, the actuator 48, the motor 50 and the battery 34. The control unit 60, the dynamo 26, the pedaling force sensor 28, the gear-changing operating device 30, the actuator 48, the motor 50, and the battery 34 can communicate with each other by power line communication. The control unit 60 controls the assisting state of the assist mechanism 32 and the gear changing state of the transmission 24.

The manual force calculation unit 62 calculates the manual drive force FA based on a signal that is output from the pedaling force sensor 28. The assisting controller 64 drives the motor 50 based on the manual drive force FA. With this, the assist mechanism 32 executes an assist corresponding to the manual drive force FA. The manual force calculation unit 62 and the assist mechanism 32 configure the electrically assisted system.

The shift controller 66 preferably includes a processor with an automatic shifting program and a manual shifting program that changes the gear changing state of the transmission 24 as discussed below. The control unit 60 can also include other conventional components such as an input interface circuit, an output interface circuit and storage devices such as a ROM (Read Only Memory) device and a RAM (Random Access Memory) device. The memory stores processing results and control programs such as ones for the control operation that are run by the one or more processors. The shift controller 66 drives the actuator 48 based on a signal output from the gear changing operating device 30 to perform manual and/or automaticshifting. When an upshift signal has been input the shift controller 66 changes the gear changing state of the transmission 24 to a shift position on the side in which the gear ratio γ increases. When a downshift signal has been input, the shift controller 66 changes the gear changing state of the transmission 24 to a shift position on the side in which the gear ratio γ decreases. In the case that an upshift signal has been input when in a shift position with the maximum gear ratio γ, and when a downshift signal has been input when in a shift position with the minimum gear ratio γ, the shift controller 66 will not change gears.

When the speed VA of the bicycle 10 is greater than the first speed VA1, the shift controller 66 controls the transmission 24 according to the operation of the gear changing operating device 30. On the other hand, when the speed VA becomes less than or equal to the first speed VA1, an automatic shitting operation is executed to control the transmission 24 based on the speed VA.

The speed calculation unit 68 calculates the speed VA, which is the traveling speed of the bicycle 10, based on a signal that is output from the dynamo 26. The output from the dynamo 26 varies periodically according to the rotation of the front wheel 16 (refer to FIG. 1). For this reason, the speed calculation unit 68 calculates the speed VA based on the number of rotations of the front wheel 16 per a prescribed time period (refer to FIG. 1) from the output of the dynamo 26.

The prohibition setting unit 70 can be manually set by the user to prohibit the transmission 24 from being automatically controlled by the shift controller based on the speed VA of the bicycle 10. The control unit 60 controls the gear changing state of the transmission 24 according only to the manual operation of the gear changing operating device 30 while the automatic control of the transmission 24 is prohibited by the prohibition setting unit 70.

Figure 3:
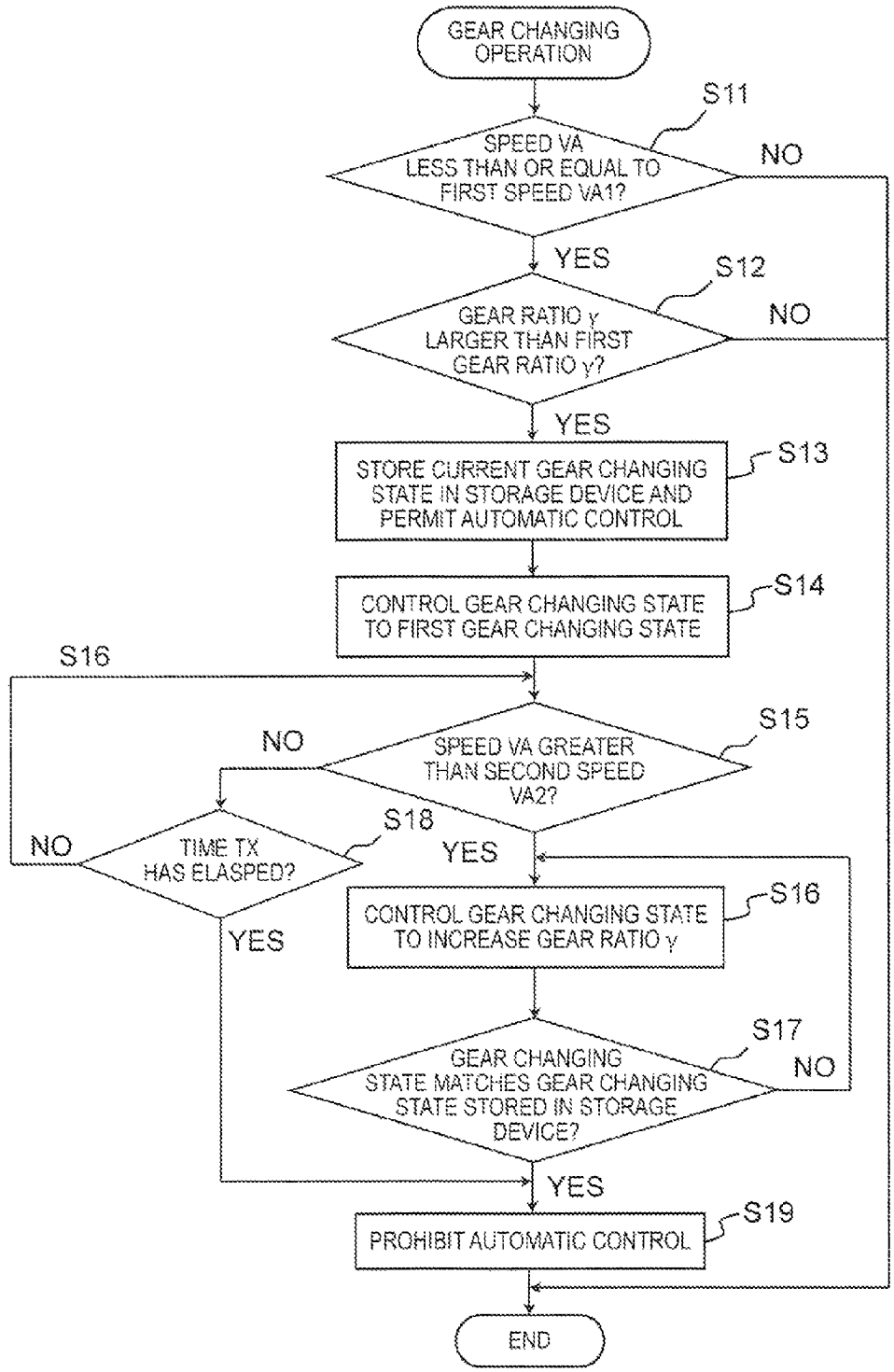
FIG. 3 is a flowchart showing steps of an automatic shifting operation that is executed by the controller of the bicycle gear changing control apparatus of the illustrated embodiment.

The automatic shifting operation that is executed by the shift controller 66 is explained with reference to FIG. 3. The shift controller 66 determines whether or not the bicycle 10 transitioned from a riding state to a stopped state in step S11. Specifically, the shift controller 66 determines whether or not the speed VA of the bicycle changed from a value that is greater than the first speed VA1 to less than or equal to the first speed VA1. When the controller determines that the speed VA is greater than the first speed VA1, the present step will be ended, and the determination step of step S11 will be executed again after a prescribed period. The first speed VA1 is a value for determining whether or not the bicycle 10 has stopped; therefore, for example, 0 km per hour can be employed.

When the shift controller 66 determines that the speed VA has become less than or equal to the first speed VA1 in step S11, a determination is made regarding whether or not the gear; ratio γ that corresponds to the gear changing state of the transmission 24 at that time is larger than a first gear ratio γ1 (first prescribed gear ratio) in step S12. When the controller determines that the speed VA is greater than the first speed VA1 the present step will be ended, and the determination step of step S11 will be executed again after a prescribed period. The first gear ratio γ1 is a gear ratio γ that corresponds to a low gear; for example, the minimum gear ratio γ can be employed.

Meanwhile, when the shift controller 66 determines that the gear ratio γ at that time is larger than the first gear ratio γ1, the current gear changing state at that time will be stored in the storage device 72, and the automatic control of the transmission 24 will be permitted by the prohibition setting unit 70 in step S13. In other words, when the speed VA of the bicycle becomes less than or equal to the first speed VA1, the prohibition setting unit 70 releases the prohibition of the automatic control. Here, "at that time" refers to when the speed VA becomes less than or equal to the first speed VA1, The gear changing state is, for example, the shift position or the gear ratio γ. Then, in step S14, the actuator 48 is controlled so that the gear changing state of the transmission 24 will be in a first prescribed gear changing state. With this, the gear ratio γ will be changed to the first gear ratio γ1.

Next, the shift controller 66 determines whether or not the bicycle 10 transitioned from a stopped state to a riding state in step S15. Specifically, the shift controller 66 determines whether or not the speed VA of the bicycle has become greater than the second speed VA2, When the controller determines that the speed VA has become greater than, or equal to the second speed VA2, the gear changing state of the transmission 24 is controlled so that the gear ratio γ will be larger than the first gear ratio γ1 in step S16. The second speed VA2 is a value for determining whether or not riding of the bicycle 10 has resumed; for example, a prescribed speed of less than or equal to 0 km per hour can be employed.

Next, in step S17, the shift controller 66 determines whether or not the gear changing state of the transmission 24 matches the gear changing state that the storage device 72 stored in step S13. When the gear changing state differs from the gear changing state that the storage device 72 stored in step S13, the gear changing state will be controlled so that the gear ratio γ will become larger again with step S16, after which the determination step of step S17 is repeated. When the shift controller 66 determines that the gear changing state matches the gear changing state that is stored in step S13, the automatic controlling is prohibited by the prohibition setting unit 70 in step S19, and the present step is ended. When the speed VA of the bicycle becomes less than or equal to the first speed VA1 again, the prohibition setting unit 70 releases the prohibition of the automatic control with the step of step S13.

When the shift controller 66 determines that the speed VA is less than or equal to the second speed VA2 in step S15, a timer that is equipped by the shift controller 66 will be used to determines whether or not time TX, which is a prescribed time, has elapsed since the speed VA became less than or equal to the first speed VA1. When the shift controller 66 determines that time TX has not elapsed, the determination step of step S15 will repeat again. Meanwhile, when the shift controller 66 determines that time TX has elapsed, the automatic control is prohibited by the prohibition setting unit 70 in step S19, and the present step is ended. For example, a prescribed time of greater than or equal to 1 hour can be employed for the time TX. In this case, automatically controlling the transmission 24 is prohibited until the speed VA becomes greater than the second speed VA2 and until the speed VA becomes less than or equal to the first speed VA1 again, in other words, until an affirmative determination is made in step S11 of the subsequent automatic shifting operations.

Figure 4:
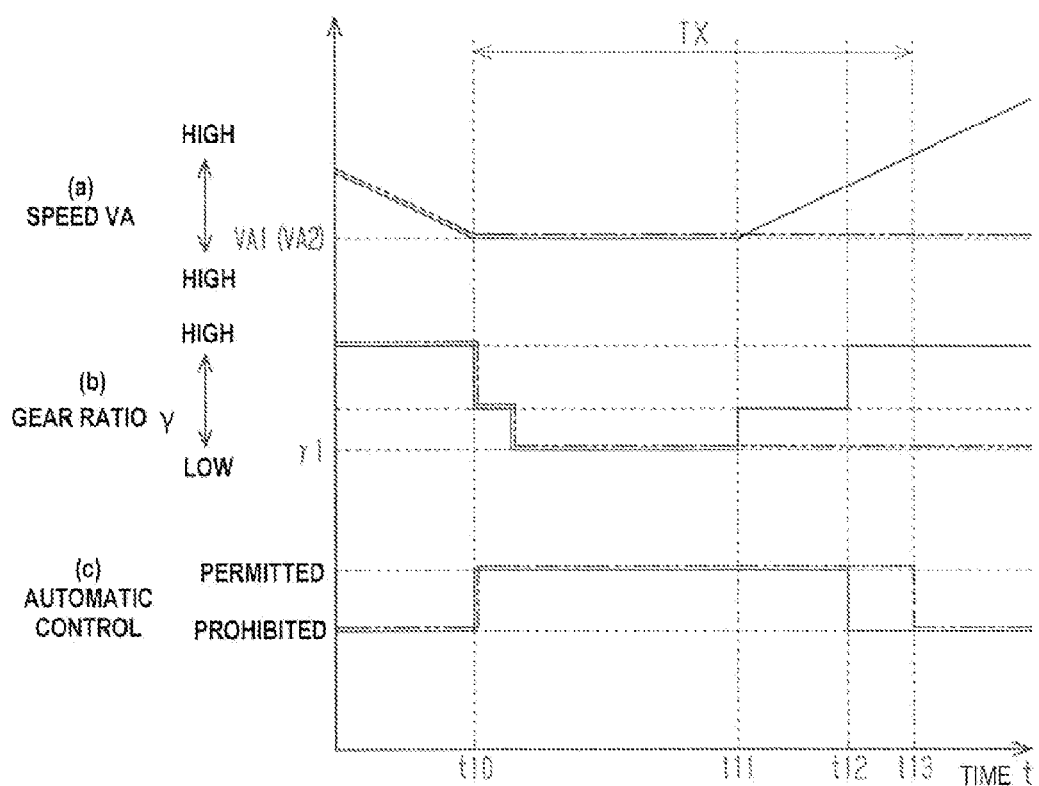
FIG. 4 is a timing chart showing an execution state of the automatic shifting operation executed by the controller of the bicycle gear changing control apparatus of the illustrated embodiment.

One example of an execution mode of the automatic shifting operation will be explained, with reference to the solid line in FIG. 4, when the stopped time, which is the elapsed time from when the speed VA of the bicycle 10 becomes less than or equal to the first speed VA1 to when the speed becomes greater than the second speed VA2, is shorter than time TX.

Time t10 shows the time at which the speed VA changes from a state that is greater than the first speed VA1 to when the speed becomes less than or equal to the first speed VA1. At this time, automatic control is permitted, for this reason, when the gear ratio γ at this time is larger than the first gear ratio γ1, the gear changing state is sequentially changed after time t10, and the gear ratio γ is changed to the first gear ratio γ1.

Time t11 indicates a time before time TX has elapsed since time t10 and when the speed VA becomes greater than the second speed VA2, The gear changing state is sequentially changed after time t11. With this, the gear changing state is changed to a gear changing state that corresponds to the gear ratio γ that is the gear ratio γ at time t10.

Time t12 indicates a time at which the gear ratio γ matches the gear ratio γ at time t10. At this time, automatic control is prohibited. With this, the transmission 24 is controlled based on the output of the gear changing operating device 30 after time 112.

One example of an execution mode of the automatic shifting operation will be explained when the stopped time is longer than time TX with reference to the chained double-dashed line in FIG. 4.

Time t13 indicates the time at which the speed VA is maintained to be less than or equal to the second speed VA2 and at which time TX has elapsed since time t10. At this time, automatic control is prohibited. With this configuration, the transmission 24 is controlled based on the output of the gear changing operating device 30 after time t13.

The control unit 60 exerts the following effects.

(1) The control unit 60 automatically controls the transmission 24 based on the fact that the speed VA has become less than or equal to the first speed VA1. For this reason, the trouble of operating the gear changing operating device 30 to lighten the manual drive force when the rider starts to pedal the pedals 40 can be omitted. After starting to pedal the pedals 40, having the gear ratio γ become larger in response to the increase in the speed VA of the bicycle 10 is preferable. The control unit 60 controls the transmission 24 so that the gear ratio γ will become larger when the speed VA becomes greater than the second speed VA2. For this reason, the burden related to changing the gear ratio γ when starting to pedal again after the bicycle 10 has been stopped can be reduced.

(2) The control unit 60 controls the transmission 24 so that the gear ratio γ will become the gear ratio γ of when the speed VA becomes less than or equal to the first speed VA1 or when the speed VA becomes greater than the second speed VA2. For this reason, the transmission 24 is automatically controlled to become the same gear ratio γ as before stopping the bicycle 10. For this reason, the burden of the rider changing the gear ratio γ again to a gear ratio γ that is appropriate for him to ride can be reduced.

(3) There are cases in which the stopped time until riding the bicycle 10 has resumed becomes long due to, for example, parking. In this case, there are cases in which the rider will change or the speed VA desired by the rider will be different when the pedals 40 is again pedaled. For this reason, when the stopped time is long, as compared to when making a temporary stop, there is a greater risk that the gear ratio γ that is appropriate for riding the bicycle 10 is different from the gear ratio γ before stopping.

In the case that the speed VA does not become greater than the second speed VA2 within time TX, the control unit 60 prohibits the transmission 24 from being automatically controlled until the speed VA becomes less than or equal to the first speed VA1 again. For this reason, after starting to pedal the pedals 40, the gear ratio γ of the bicycle 10 will not be automatically changed to the gear ratio γ that corresponds to the gear changing state that is stored in the storage device 72 at the time of starting. For this reason, the risk that there will be an automatic change to a gear ratio γ that the rider does not desire can be reduced.

(4) Depending on the leg strength of the rider or the riding environment, etc., there are cases in which an excessive load will be put on the rider when the gear ratio γ is made large after starting to pedal the pedals 40. The bicycle 10 comprises a motor 50. For this reason, the manual drive force can be assisted when riding the bicycle 10 resumes. For this reason, an excessive load being put on the rider can be suppressed.

The specific form that the present controller can take is not limited to the forms illustrated in the above-described embodiment. The present controller can take various forms that are different from the above-described embodiment. The modified example of the above-described embodiment explained below is one example of the various forms that the present controller can take.

The determination step of step S18 of the automatic shifting operation can be omitted, in this case, when the speed VA becomes greater than the second speed VA2. regardless of the duration of the stopped time, the transmission 24 is automatically controlled until the gear changing state matches the gear changing state that is stored by the storage device 72.

The determination step of step S18 of the automatic shifting operation can also be omitted. In this ease as well, the shift controller 66 will control the transmission 24 so that the gear ratio γ will become larger until becoming a prescribed gear ratio γ or shift position. For this reason, the burden related to changing the gear ratio γ when starting to pedal again after the bicycle 10 has been stopped can be reduced.

In step S16 of the automatic shifting operation, the gear changing state of the transmission 24 can be controlled according to time. For example, the gear ratio γ is increased based on the fact that the elapsed time since the speed VA became greater than the second speed VA2 exceeded the determination time. Additionally, in the case of changing the gear changing state by repeating step S16, the shift controller 66 makes the transmission 24 shift with an interval T until the next shifting. This interval T can be set in advance, can be set by the rider, or can be varied depending, on the speed of the bicycle. In the case that the interval T is set by the rider, for example, a cycle computer is connected to the control unit 60, and a setting switch provided to the cycle computer is used. Additionally, in the case of varying the interval T according to the speed VA, the shift controller 66 may control the interval T by using a correlation table or a function of the speed and the interval T so that the interval T will become smaller as the speed VA increases.

In step S16 of the automatic shifting operation, the gear changing state of the transmission 24 can be controlled according to the speed VA, For example, the gear ratio γ is increased based on the fact that the speed VA became greater than the determination speed. For example, the shift controller 66 controls the transmission 24 according to the speed VA by using a correlation table or a function of the speed VA and the gear ratio γ.

The first speed VA1 can be changed to a speed VA with which the stopping of the bicycle is projected within a set period of time. In this, case, the control of the gear changing state in step S14 is executed before the bicycle 10 stops. For the speed VA with which stopping is projected, a value that is in the vicinity of 0 km per hour and a value greater than 0 km per hour, for example, 3 km per hour, can be employed. Regarding the second speed VA2, for example, a value that is. greater than 0 km per hour, for example, 3 km per hour, can be employed. By employing a value that is greater than 0 km per hour for the second speed VA2, shifting due to a forwards and backwards oscillation of the bicycle in a stopped state can be suppressed. The first speed VA1 and the second speed VA2 can also be made to be different values.

A rotation sensor that outputs a signal corresponding to the rotational speed of the front wheel 16, the rear wheel 18, or the crankshaft 38 can be employed instead of the dynamo 26, and the speed VA can be calculated based on the output of the rotation sensor. In short, any sensor can be employed as long as the sensor outputs a signal corresponding to the speed of the bicycle 10.

An operating unit with which the rider can change the setting for prohibiting and permitting the execution of the automatic shifting operation can also be added.

An operating unit with which the rider can change the setting for prohibiting and permitting the execution of the steps of S15-S18 in step S13 of the automatic shifting operation can also be added.

The assist mechanism 32 can also be omitted.

The transmission 24 can be changed to a continuously variable transmission that can also continuously change the gear ratio γ. Additionally, the transmission can be changed to an external type of transmission. In short, any transmission can be employed as long as the transmission can change the gear ratio γ of the bicycle 10.

The control unit 60 can be connected with at least one of the dynamo 26, the pedaling force sensor 28, or the gear changing operating device 30 by wireless communication.

The control unit 60 can be connected with the dynamo 26, the pedaling force sensor 28, the gear changing operating device 30, the actuator 48, the motor 50, and the battery 34 by normal wired communication rather than a wireless communication.

While only selected embodiments have been chosen to illustrate the present, invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle gear changing control apparatus comprising:
a shift controller programmed to:
control a gear changing state of a bicycle transmission according to an operation of a gear changing operating device upon determining a traveling speed of a bicycle is greater than a first speed;
control the bicycle transmission automatically to be in a first prescribed gear changing state upon determining the traveling speed of the bicycle becomes less than or equal to the first speed and upon determining a gear ratio of a current gear changing state of the bicycle transmission is larger than a preset gear ratio of the first prescribed gear changing state;
store the gear ratio of the current gear changing state upon determining that the traveling speed of the bicycle is less than or equal to the first speed and upon determining that the gear ratio of the current gear changing state of the bicycle transmission is larger than the preset gear ratio of the first prescribed gear changing state;
control the bicycle transmission automatically to be the stored gear ratio upon determining that the traveling speed of the bicycle has become greater than a second speed after controlling the bicycle transmission to be in the first prescribed gear changing state.

2. The bicycle gear changing control apparatus as recited in claim 1, further comprising a prohibition setting unit programmed to a prohibit the bicycle transmission from being automatically controlled by the shift controller.

3. The bicycle gear changing control apparatus as recited in claim 2, wherein
the shift controller is further programmed to control the gear changing state of the bicycle transmission according only to the operation of the gear changing operating device while the gear changing operating device is being prohibited from being automatically controlled.

4. The bicycle gear changing control apparatus as recited in claim 1, further comprising
a storage device in which the shift controller stores the gear ratio of the current gear changing state.

5. The bicycle gear changing control apparatus as recited in claim 1, wherein
the first speed and the second speed are 0 km per hour.

6. An electrically assisted system comprising the bicycle gear changing control apparatus as recited in claim 1, and further comprising:
a motor that assists a manual drive force.

7. A bicycle gear changing control apparatus comprising:
a shift controller programmed to:
control a gear changing state of a bicycle transmission according to an operation of a gear changing operating device upon determining a traveling speed of a bicycle is greater than a first speed;
control the bicycle transmission automatically to be in a first prescribed gear changing state upon determining the traveling speed of the bicycle becomes less than or equal to the first speed and upon determining a gear ratio of a current gear changing state of the bicycle transmission is larger than a preset gear ratio of the first prescribed gear changing state; and
control the bicycle transmission automatically, after controlling the bicycle transmission to be in the first prescribed gear changing state, to a larger gear ratio than the gear ratio of the first prescribed gear changing state, upon determining the traveling speed of the bicycle becomes greater than a second speed; and
control the bicycle transmission after the traveling speed of the bicycle becomes greater than the second speed based on a length of time after controlling the bicycle transmission in order to be in the first prescribed gear changing state.

8. A bicycle gear changing control apparatus comprising:
a shift controller programmed to:
control a gear changing state of a bicycle transmission according to an operation of a gear changing operating device upon determining a traveling speed of a bicycle is greater than a first speed;
control the bicycle transmission automatically to be in a first prescribed gear changing state upon determining the traveling speed of the bicycle becomes less than or equal to the first speed and upon determining a gear ratio of a current gear changing state of the bicycle transmission is larger than a preset gear ratio of the first prescribed gear changing state; and
control the bicycle transmission automatically, after controlling the bicycle transmission to be in the first prescribed gear changing state, to a larger gear ratio than the gear ratio of the first prescribed gear changing state, upon determining the traveling speed of the bicycle becomes greater than a second speed; and
prohibit the bicycle transmission from being automatically controlled after controlling the bicycle transmission to be in the first prescribed gear changing state upon determining that the traveling speed of the bicycle does not become greater than the second speed within a prescribed time until the traveling speed of the bicycle becomes greater than the second speed and the traveling speed of the bicycle becomes less than or equal to the first speed again.

9. A bicycle gear changing control method comprising:
controlling a gear changing state of a bicycle transmission according to an operation of a gear changing operating device while a traveling speed of a bicycle is greater than a first speed;
automatically controlling the bicycle transmission to be in a first prescribed gear changing state upon the traveling speed of the bicycle becoming less than or equal to the first speed and upon a gear ratio of a current gear changing state of the bicycle transmission becoming larger than a gear ratio of the first prescribed gear changing state;
storing the gear ratio of the current gear changing state upon the traveling speed of the bicycle becoming less than or equal to the first speed and upon the gear ratio of the current gear changing state of the bicycle transmission becoming larger than the gear ratio of the first prescribed gear changing state; and
further automatically controlling the bicycle transmission, so that the gear ratio will be the stored gear ratio upon the traveling speed of the bicycle becoming greater than a second speed after controlling the bicycle transmission to be in the first prescribed gear changing state.

* * * * *